A. C. BARSTOW.
Tea Kettle.
No. 37,483.
Patented Jan. 27, 1863.
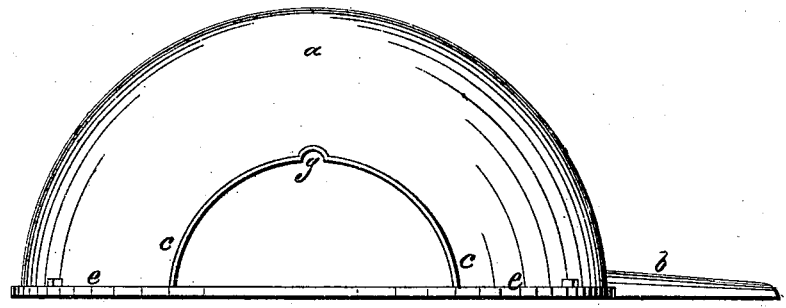
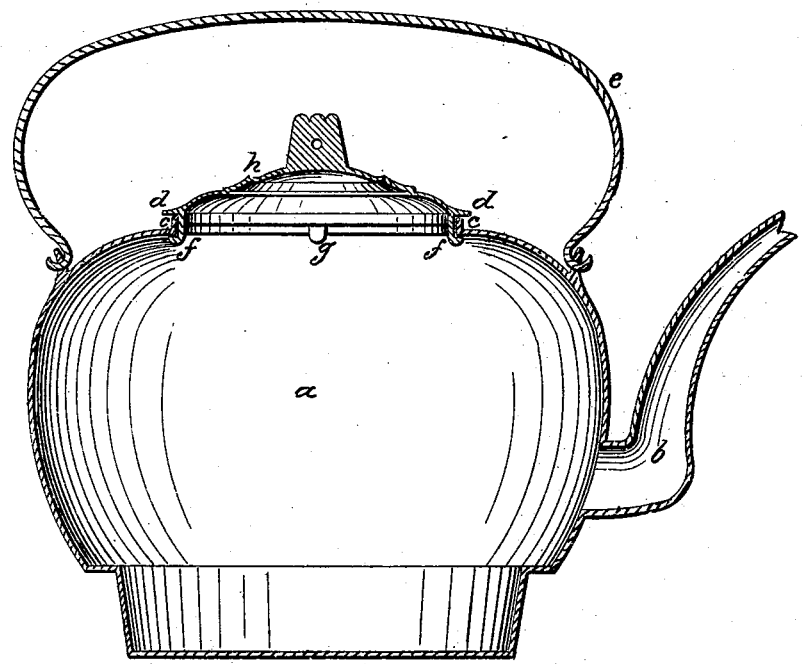
Witnesses:
Wm H. Harrison.
Rufus Waples.
Inventor:
A. C. Barstow
by A. P. Clok
his atty

UNITED STATES PATENT OFFICE.

AMOS C. BARSTOW, OF PROVIDENCE, RHODE ISLAND.

IMPROVEMENT IN TEA-KETTLES.

Specification forming part of Letters Patent No. 37,483, dated January 27, 1863.

*To all whom it may concern:*

Be it known that I, AMOS C. BARSTOW, of Providence, in the county of Providence and State of Rhode Island, have invented certain new and useful Improvements in Cast-Iron Tea-Kettles; and I hereby declare that the following is a full, clear, and exact description of the same, reference being had to the accompanying drawing, which represents a sectional elevation of my improved tea-kettle.

The use of cast-iron tea-kettles on cook stoves and ranges has been much limited by the fact that the kettle could not be emptied of its contents without its cover falling off, to the injury of such dishes as were near it, or (when the water was boiling hot,) to the greater injury of the hand holding it, which thus became exposed to a sudden rush of steam. Tin and copper tea-kettles have therefore been much used, as covers made of those metals may close tight enough to hold themselves on. A tin tea-kettle is as costly as an iron one, and a copper one is much more so, while neither so is durable, so useful, or so easily kept clean. Some simple plan, therefore, to secure the cover to an iron tea-kettle when its center of gravity is lost has seemed very desirable. I have accomplished this by casting or otherwise attaching pendent hooks upon the rim of the cover, which drop below the rim, raised on the kettle to receive the cover. Openings are made in the kettle-rim to allow these projecting-hooks to drop to their places, when by a slight turn it is held firmly there. The top of the cover is made broad enough to cover the openings in the kettle-rim, so as to prevent the escape of steam.

To enable others skilled in the art to make and use my invention, I shall now proceed to describe more particularly its construction and operation.

*a* is the bowl of an iron tea-kettle, cast in the usual form with its spout *b*. On the upper part of the kettle there is a vertical rim, *c*, into which are wrought two or more openings or depressions, *g*, for the free passage of the hooks *f*, cast onto the cover *h*, which is provided with a horizontal flange, *d*, of such width as to cover the openings or depressions *g*, before referred to. The usual bail, *e*, is hinged to opposite sides of the bowl for the handling of the kettle.

The operation of this tea-kettle will be readily understood from inspection of the drawing. The cover is put on or removed from the kettle by presenting opposite the depressions in the kettle the hooks on the cover. When so opposite, the cover may be placed so as to fit its flange snugly against the rim of the kettle. The flange being wider than the depressions in the rim, the opening will thereby be covered, and thus prevent steam to escape from the kettle. The cover being fitted onto the kettle, a slight turn is imparted to it on its center or axis, when the hook will clasp or engage with the under side of the rim, and thus take a firm hold on the kettle. By thus securing hold of the cover on the kettle any inclination may be given to the latter without danger of dropping the cover or scalding the hand by escaping steam.

Having thus described my improved tea-kettle, what I claim as my invention, and desire to secure by Letters Patent, is—

The formation of depressions in the rim of cast-iron tea-kettles, in combination with a flanged cover having corresponding pendent hooks, the whole being constructed and arranged substantially as described, to operate in the manner and for the purposes set forth.

In testimony whereof I have signed my name to this specification before two subscribing witnesses.

A. C. BARSTOW.

Witnesses:
  A. POLLOK,
  EDM. F. BROWN.